United States Patent [19]
Borromeo

[11] Patent Number: 5,083,476
[45] Date of Patent: Jan. 28, 1992

[54] HANDLEBAR FOR CYCLES, PARTICULARLY RACING BICYCLES

[75] Inventor: Lucio Borromeo, Turin, Italy

[73] Assignee: 3 T S.p.A., Turin, Italy

[21] Appl. No.: 543,927

[22] Filed: Jun. 26, 1990

[30] Foreign Application Priority Data

Nov. 30, 1989 [IT] Italy .................. 68064 A/89

[51] Int. Cl.⁵ ............................................. B62K 21/12
[52] U.S. Cl. ............................... 74/551.1; D12/178
[58] Field of Search ..................... 74/551.1–551.8; D12/178

[56] References Cited

U.S. PATENT DOCUMENTS

| D. 208,448 | 8/1967 | Fritz ........................... D12/178 |
| 379,955 | 3/1888 | Hedger ....................... 74/551.1 |
| 574,751 | 1/1897 | Newman ....................... 74/551.1 |
| 4,503,723 | 3/1985 | Shimano ....................... 74/551.1 |
| 4,829,847 | 5/1989 | Modolo ......................... 74/551.1 |

FOREIGN PATENT DOCUMENTS

| 274442 | 4/1988 | European Pat. Off. ............ 74/551.1 |
| 961924 | 5/1950 | France ............................. 74/551.1 |
| 1121588 | 8/1956 | France ............................. 74/551.1 |
| 2476557 | 7/1981 | France ............................. 74/551.1 |
| 8702956 | 8/1986 | PCT Int'l Appl. ................. 74/551.1 |

*Primary Examiner*—Vinh T. Luong
*Attorney, Agent, or Firm*—Sughrue, Mion, Zinn, Macpeak & Seas

[57] ABSTRACT

A bicycle handlebar comprises a substantially straight central part for connection to the steering column of the bicycle and two lateral handles which curve downwardly with a general concavity intended to face rearwardly in use. Each lateral handle has a central portion which of the concavity is intended to support the cyclist's hand and is curved in the opposite sense from the remaining parts of the concavity of the handle.

6 Claims, 1 Drawing Sheet

HANDLEBAR FOR CYCLES, PARTICULARLY RACING BICYCLES

BACKGROUND OF THE INVENTION

The present invention relates to bicycle handlebars and has been with particular attention to its possible application to the handlebars of racing bicycles.

According to a conventional solution, such a handlebar is constituted essentially by a substantially straight central part for connection to the steering column of the cycle and two lateral handles which extend generally downwardly with a general concavity which faces rearwardly in the normal conditions of use of the handlebar.

The handles extend with an approximately constant radius of curvature which may increase gradually towards the free ends of the handlebar which are intended to extend horizontally. Alternatively, a selectively variable radius of curvature has already been proposed by several parties in the art, particularly for the central portion of the handle on which the palm of the cyclist's hand is intended to rest in order to facilitate its support.

These solutions, and particularly that of making the central portion of the handle straight or almost straight, cannot be considered completely satisfactory from the anatomical and ergonomic points of view.

There is therefore a need to provide a handlbar for cycles which provides a radical solution to the problems of stress and fatigue of the rider's hands and can thus be considered wholly correct from the anatomical and ergonomic points of view.

SUMMARY OF THE INVENTION

According to the present invention, this object is achieved by virtue of a handlebar having a substantially straight central part adapted to be connected to a steering column of a bicycle and two lateral handles at opposite ends of said central part which extend generally downwardly with general concavities which face rearwardly in a normal position of use of the handlebar, wherein the handles include intermediate portions which define regions for supporting a bicyclist's hands, and are curved in an opposite sense from the general curvature of the rest of the handles with concavities which face forwardly and downwardly in the normal position of use of the handlebar.

BRIEF DESCRIPTION OF THE DRAWINGS

The invention will now be described purely by way of non-limiting example, with reference to the appended drawings, in which.

DETAILED DESCRIPTION OF THE INVENTION

Figure 1:
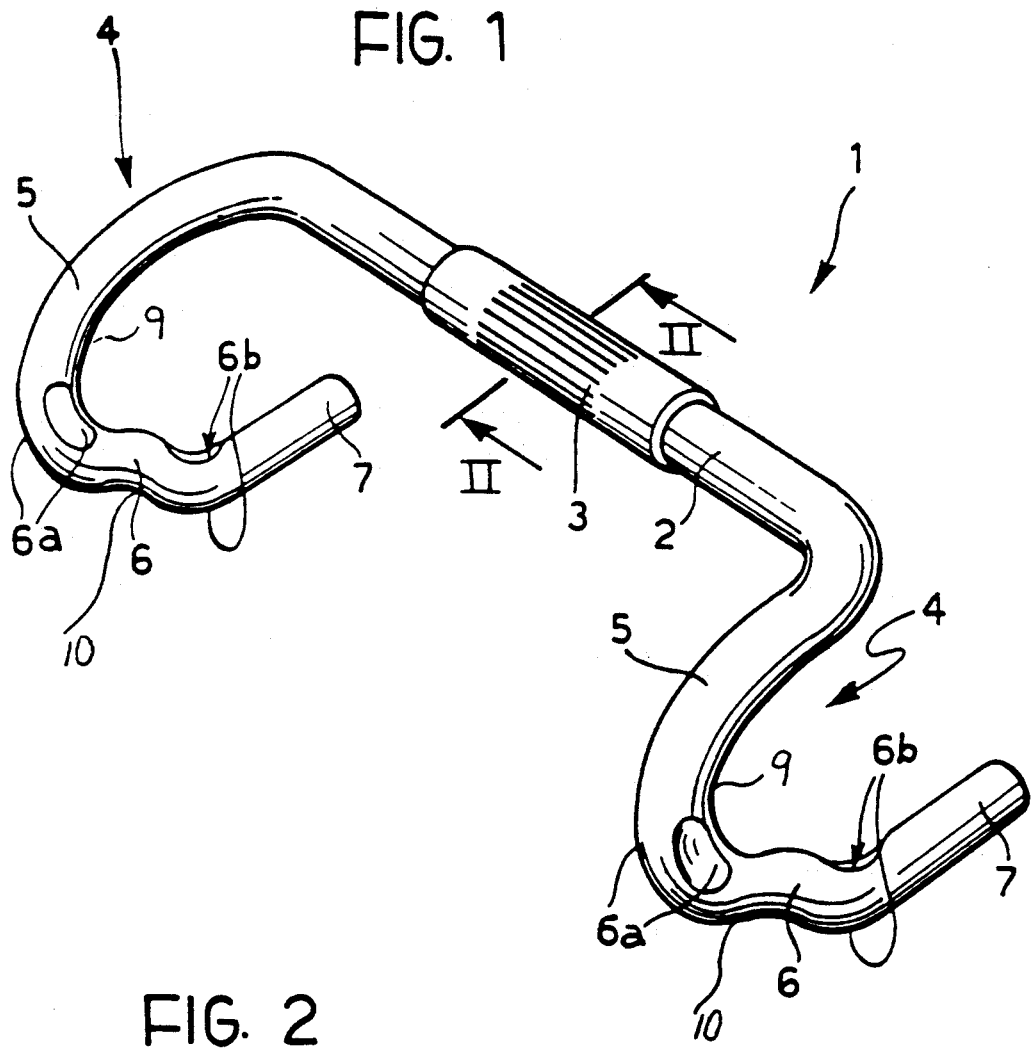
FIG. 1 is a general perspective view of a handlebar for bicycles produced according to the invention.
Figure 2:
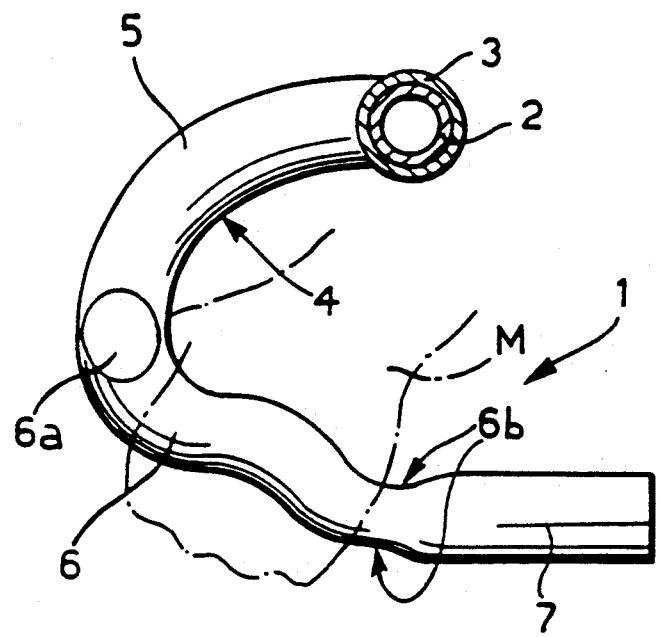
FIG. 2 is a cross-sectional view of the same handlebar taken along the line II—II in FIG. 1.

In the drawings, a bicycle handlebar is generally indicated 1.

According to a preferred embodiment, this may be a handlebar for use on sports bicycles for racing.

According to a widely known solution, the handlebar 1 (which is made from one or more metal profiles, for example of aluminum alloy, according to widely known technology) can be seen to have:

a substantially straight central part 2 which is intended to be fixed centrally, for example in correspondence with a strengthened region 3, to the steering column of the cycle (not shown in the drawings), and two lateral handles 4 which are bent generally downwardly with a general concavity 9 which faces rearwardly (that is, towards the cyclist) in the normal condition of use.

The main characteristic of the handlebar according to the invention is the fact that each handle 4 can generally be seen to have:

an upper portion 5 which is curved downwardly and is approximately 70–90 mm long (an angular extent of approximately 90°) with an almost constant internal radius of curvature of the order of 45 mm (average radius 57 mm), an intermediate or central portion 6 which is intended to act as the region for supporting the cyclist's hand M and which is about 40–45 mm long and also has an almost constant radius of curvature of the order of 80–100 mm, and a lower end portion 7 located in a distal position relative to the intermediate portion 6; the end portion is approximately 30–40 mm long with a more or less constant internal radius of curvature of the order of 45 mm (average 57 mm) such that the end portions of the handles 4 extend approximately horizontally in the normal conditions of use.

The main characteristic of the intermediate portion 6 is that it is curved in the opposite sense from the upper and lower portions 5 and 7.

In fact, the curvature of these latter two portions 5, 7 is in the same sense as the general downward and rearward curvature of the handle parts 4 (with a general rearward concavity 10). The concavity of each intermediate portion 6, however, fades outwardly of the cycle (that is, forwardly and/or downwardly) and is thus presented to the cyclist's grip as a generally raised portion within the handle 4.

This shape of the intermediate portions 6 matches very precisely the shape of the palms of the cyclist's hands (which are generally basin or bowl-shaped). These central portions can therefore be gripped much more precisely and comfortably by the cyclist (even during braking operations) than with conventional solutions in which these portions are either concave in the opposite sense (rearwards) or almost straight.

According to a solution which has been found to be preferable, the tube constituting the handlebar is squashed slightly in the connecting regions 6a, 6b between the intermediate portion 6 and the upper and lower portions 5 and 7 so as generally to have an approximately elliptical or ovoid cross-section. More precisely, the upper connecting region (6a) is squashed longitudinally (major axis in the position of advance of the cycle) whilst the lower connecting region (6b) is squashed horizontally (major axis horizontal).

What is claimed is:

1. A handlebar for bicycles, comprising a substantially straight central part adapted to be connected to a steering column of a bicycle and two lateral handles at opposite ends of said central part which extend generally downwardly with respective first general concavities which face rearwardly in a normal position of use of the handlebar, wherein the handles include intermediate portions which define regions for gripping the handlebar, and are curved in an opposite sense from the general curvature of the rest of the handles with respective second concavities which face forwardly and downwardly in the normal position of use of the handlebar, wherein each of the handles has:
- an upper portion situated between the substantially straight central portion and the intermediate portion and having one of said first concavities facing generally rearwardly in the normal condition of use of the handlebar, and
- an end portion located in a distal position relative to the intermediate portion and also having one of said second concavities facing generally rearwardly in the normal condition of use, each end portion having an end region which, in the normal condition of use, extends substantially horizontally.

2. A handlebar according to claim 1, wherein the upper portion is approximately 70–90 mm long.

3. A handlebar according to claim 1, wherein the upper portion has an internal radius of curvature of about 45 mm.

4. A handlebar according to claim 1, wherein the end portion is approximately 30–40 mm long.

5. A handlebar according to claim 1, wherein the end portion has a radius of curvature of about 45 mm.

6. A handlebar according to claim 1, wherein, between the intermediate portion and the upper portion and the end region respectively, the handlebar has connecting regions which are slightly squashed longitudinally and horizontally respectively.

* * * * *